Oct. 18, 1966  T. K. WOOD ETAL  3,279,905
METHOD AND APPARATUS FOR FORMING GLASS BEADS
Filed March 27, 1962  2 Sheets-Sheet 1
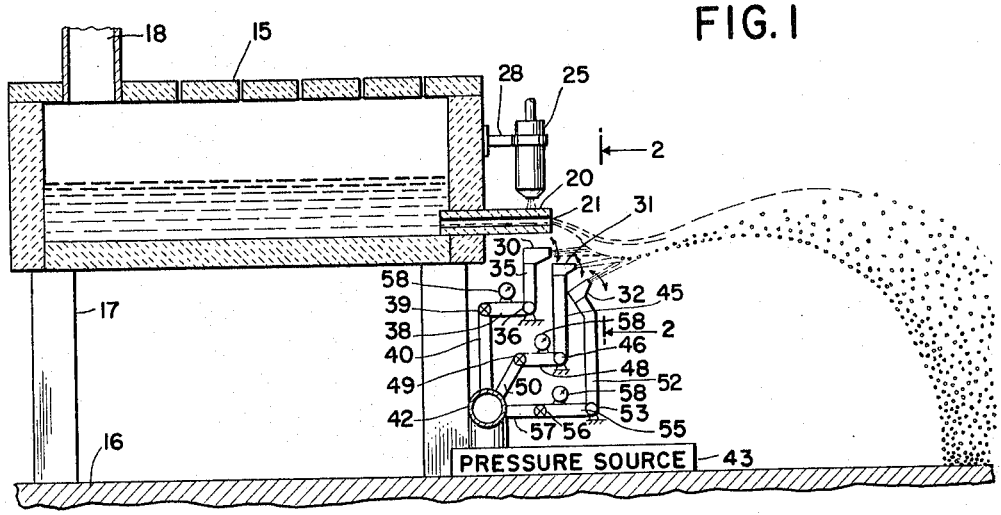
FIG. 1
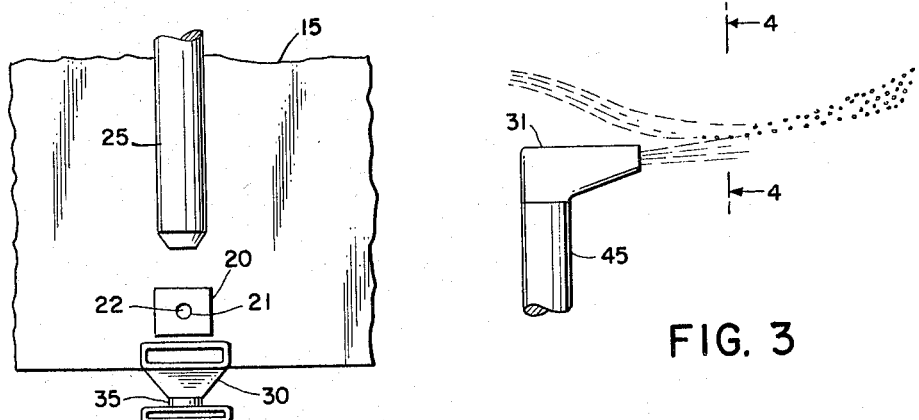
FIG. 2
FIG. 3
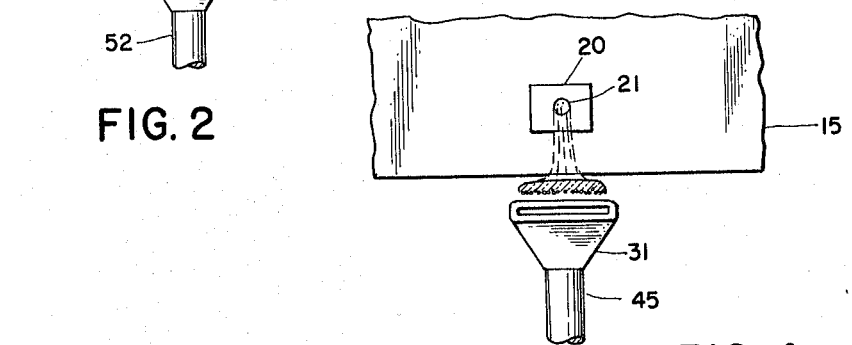
FIG. 4

3,279,905
METHOD AND APPARATUS FOR FORMING GLASS BEADS
Thomas K. Wood, Essex Fells, Arthur G. Nylander, Denville, and Forrest L. Hackett, Arlington, N.J., assignors to Potters Brothers, Inc., Carlstadt, N.J., a corporation of New York
Filed Mar. 27, 1962, Ser. No. 182,809
16 Claims. (Cl. 65—21)

This invention relates to a novel method and apparatus for manufacturing discrete particles of glass or other vitreous material and more particularly to a novel method and apparatus for forming glass beads.

Glass beads or other discrete particles manufactured in accordance with the invention have many industrial and commercial applications. For example, the beads frequently are employed to provide a reflecting surface for motion picture screens, highway signs, marking paints, advertising signs, etc. In most cases, it is desirable that the beads be of spherical configuration, particularly because irregular or non-spherical beads tend to diffract the incident light rays to such an extent that the reflecting properties of the surface are seriously impaired.

Various methods and apparatus have been used heretofore in the formation of glass beads. Thus, in some cases the glass was manufactured and, upon cooling, was crushed to form minute particles. These particles were introduced into the vertical stack of a furnace in a manner such that the particles were remelted while in suspension in a heated gaseous medium and were shaped by surface tension into a substantially spherical configuration to form the glass beads. For a more detailed discussion of representative methods and apparatus of this type, reference may be had, for example, to Patent 2,619,776 granted December 2, 1952, to Rudolf H. Potters.

Primarily because of the high cost and inefficiency resulting from the necessity for manufacturing and crushing the glass before it could be heated to form glass beads, attempts have been made through the years to produce the beads by the dispersion of molten glass. These attempts in most instances involved the direction of a blast of high velocity gas transversely against a vertically flowing stream of molten glass to disperse the glass into a multiplicity of particles, the blast of gas thereafter carrying the particles along a heated path to enable them to assume a generally spherical shape.

The prior methods and apparatus employed in the manufacture of glass beads have exhibited several disadvantages. For example, it heretofore has been difficult to maintain the glass particles at the required temperature during the formation of the beads, and extensive heating apparatus often was required to insure that all of the beads conformed to the desired spherical configuration. In addition, and this has been of special moment in prior methods and apparatus involving the dispersion of molten glass, difficulties frequently were encountered in producing uniformly spherical beads while avoiding the formation of glass fibers. Furthermore, it often has been difficult heretofore to accurately control the path of the glass particles prior to the setting thereof to form glass beads.

One general object of this invention, therefore, is to provide a novel and economical method and apparatus for forming glass beads or other spherical particles.

More specifically, it is an object of this invention to provide such a method and apparatus wherein the necessity for extensive heating equipment for the glass particles is substantially eliminated.

Another object of this invention is to provide a method and apparatus of the character indicated in which the formation of glass fibers is greatly reduced.

A further object of this invention is to provide a process for forming glass beads in which the path of the glass particles is accurately controlled.

Still another object of the invention is to provide a new and improved apparatus for manufacturing glass beads that is economical and thoroughly reliable in operation.

In one illustrative embodiment of the invention, glass stock is melted in a suitable furnace or other container to form molten glass. The molten glass is discharged from the furnace in a stream which is directed along a substantially horizontal path and is contacted by a diverging gas jet of high kinetic energy which disperses the stream into a multiplicity of glass particles. As these particles continue their movement along the path, they are shaped by surface tension into spherical form and are then cooled to cause the setting thereof to form glass beads.

In accordance with one feature of the invention, the diverging, high energy gas is directed along an axis which is substantially parallel to the molten glass stream and is in close proximity therewith. With this arrangement, the resulting beads conform with the desired spherical configuration, and the formation of glass fibers is maintained at a minimum.

In accordance with another feature of the invention, in certain particularly advantageous embodiments, a second jet of gas is applied to the glass stream shortly after its discharge from the furnace and prior to the point at which the high energy jet contacts the stream. This second jet further insures that the direction of the stream is substantially horizontal at the time it is dispersed by the high energy jet.

In accordance with a further feature of the invention, in certain good arrangements, a third jet of gas is applied to the glass particles immediately downstream of the point of contact of the high energy jet. The third jet directs the particles in an upwardly inclined direction to further facilitate the shaping and setting thereof to form the glass beads.

The present invention, as well as further objects and features thereof, will be understood more clearly and fully from the following description of certain preferred embodiments, when read with reference to the accompanying drawings, in which:

FIGURE 1 is a diagrammatic view, partly in section, of an apparatus suitable for dispersing a stream of molten glass to form glass beads in accordance with one illustrative embodiment of the invention;

FIGURE 2 is an elevational view of certain parts of the apparatus, as viewed along the line 2—2 in FIGURE 1;

FIGURE 3 is a fragmentary view of the glass stream together with a portion of the apparatus of FIGURE 1;

FIGURE 4 is a sectional view taken generally along the line 4—4 in FIGURE 3;

Figure 5:
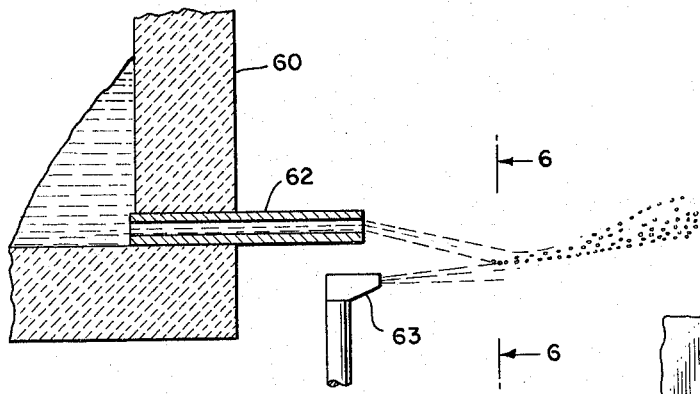
FIGURE 5 is a fragmentary view in general similar to FIGURE 3 but showing portions of an apparatus in accordance with another illustrative embodiment of the invention.

Referring to FIGURE 1 of the drawings, there is shown a glass furnace 15 of ceramic or other heat resistant material which is supported a suitable distance above the floor 16, as by legs 17. The furnace 15 includes a charging opening 18 through which is inserted the glass stock or other vitreous material to be formed into beads. Conventional heating apparatus (not shown) are employed to maintain the glass in the furnace in a molten state under controlled viscosity.

Positioned adjacent the lowermost portion of the furnace 15 at the right-hand end thereof, as viewed in FIGURE 1, is a drain-out block 20 of ceramic or other suitable material. The block 20 protrudes horizontally from the furnace and, as best shown in FIGURE 2, includes an aperture 21 which, during the bead forming operation, provides communication between the furnace interior and the atmosphere. A suitable plug 22 is mounted adjacent the inner end of the aperture 21 to provide a temporary seal. The external portion of the block 20 is heated by a burner 25 which is suitably supported by a bracket 28 affixed to the adjacent portion of the furnace. The burner 25 is of conventional construction and is arranged to direct a jet of hot gas toward the exposed upper surface of the block 20.

Positioned in spaced, juxtaposed relationship with each other immediately adjacent the outer end of the elongated drain-out block 20 are three fluid nozzles 30, 31 and 32. In the position shown in FIGURE 1, the longitudinal axis or center line of the nozzle 30 extends in a horizontal direction which is parallel to the axis of the drain-out block aperture 21. The nozzle is oriented in close proximity with the lower surface of the block 20 and is connected to an upstanding pipe 35 which is pivotally supported adjacent its lower end, as at 36. The pipe 35 is connected through a conduit 38, a valve 39 and a conduit 40 to a manifold 42 leading to a source 43 of air or other fluid under pressure.

In the position shown, the longitudinal axis of the nozzel 31 likewise extends in a horizontal direction which is parallel to the axis of the drain-out block aperture 21. The nozzle 31 is oriented beneath and on the downstream side of the nozzle 30 in close proximity with block 20. An upstanding pipe 45 is pivotally supported at 46 and connects the nozzle 31 to a conduit 48, a valve 49 and a conduit 50 leading to the pressure manifold 42.

The longitudinal axis of the nozzle 32 extends in an upwardly inclined direction in a vertical plane which includes the axes of the nozzles 30 and 31. The nozzle 32 is positioned downstream of the nozzle 31 and is connected to the manifold 42 through a pipe 52 pivotally supported at 53, a conduit 55, a valve 56 and a conduit 57. The conduits 38, 48 and 55 for the respective nozzles 30, 31 and 32 are each provided with suitable pressure-indicating means, such as a gauge 58.

The pivots 36, 46 and 53 enable the movement of the respective nozzles 30, 31 and 32 about horizontal axes which extend laterally in directions transverse to the axis of the drain-out block aperture 21. With this arrangement, the positions of the nozzles relative to the drain-out block 20 may be readily adjusted in a rapid and straightforward manner.

As best shown in FIGURE 2, each of the nozzles 30, 31 and 32 is of flattened, substantially rectangular cross-section, the wider dimension thereof extending in a horizontal direction which is transverse to the axis of the drain-out block aperture 21. The area of the discharge opening of the nozzle 30 is substantially the same as that of the nozzle 32. The area of the discharge opening of the nozzle 31, however, is considerably less than that of the nozzle 30 or 32, for purposes that will become more fully apparent hereafter.

The glass stock or other vitreous material in the furnace 15 is heated to a temperature sufficient to produce molten glass of relatively low viscosity, when compared with the viscosity of glass in conventional glass manufacturing techniques. In the embodiment illustrated in FIGURE 1, the temperature of the molten glass advantageously is within the range of from about 1,900° F. to about 2,500° F., and preferably from about 2,100° F. to about 2,300° F., although in other good arrangements the glass temperature may be outside these ranges without deleterious effect. Although the viscosity of the heated glass depends in part on such factors as the type of glass employed, the desired size of the resulting beads, etc., for many applications the glass viscosity is relatively low and preferably lies within a range of from about fifty poises down to about one poise or even lower. In other arrangements, particularly in cases in which comparatively large size beads are to be produced, good results are achieved with a viscosity that is in excess of this range.

At the start of the bead forming operation, the plug 22 in the aperture 21 is removed to initiate the flow of molten glass into the space on the adjacent side of the furnace 15. The vertical distance between the surface level of the molten glass inside the furnace and the block 20 is such that the glass is discharged from the aperture 21 in a uniform, free flowing stream. The temperature drop of the glass stream as it passes from the furnace to the discharge end of the block is maintained at a minimum by the burner 25, thereby further insuring the free and continuous discharge of the molten glass.

Upon the opening the valves 39, 49 and 56 for the nozzles 30, 31 and 32, respectively, compressed air or other fluid is admitted from the pressure source 43 and the manifold 42 to each nozzle and is discharged therefrom in a flattened, slightly diverging jet. In the positions shown in FIGURE 1, the axes of the fluid jets from the nozzles 30 and 31 are substantially horizontal, while the axis of the jet from the nozzle 32 extends in an upwardly inclined direction. As indicated heretofore, the area of the discharge opening of the nozzle 31 is somewhat less than that of the nozzle 30 or 32. As a result, the kinetic energy of the fluid leaving the nozzle 31 is considerably greater than the energy of the fluid discharged from the nozzles 30 and 32. The pressure of the fluid in the manifold 42 illustratively is about 100 p.s.i.g. and is such that the fluid from the nozzle 31 is discharged at a high velocity. In the embodiment illustrated in FIGURE 1, the fluid preferably is at substantially room temperature, although in other arrangements steam or other heated fluids may be employed with satisfactory results.

At the time the glass stream leaves the drain-out block 20, it is flowing along a horizontal path. Shortly thereafter, gravitational forces cause the stream to slope downwardly slightly until it comes in contact with the horizontal jet of air from the nozzle 30. This nozzle serves as a control nozzle to insure that the path of the stream is substantially horizontal. The position of the nozzle relative to the block 20 preferably is such that the horizontal jet from the nozzle contacts the stream immediately after its discharge from the block, thus minimizing the energy needed to direct the stream along its horizontal path.

The horizontal, diverging jet of high kinetic energy gas from the nozzle 31 strikes the glass stream immediately downstream of the point of contact of the control nozzle 30. The stream at this time is flowing in a direction which is substantially parallel to and immediately above the axis of the air jet from the nozzle 31. As best shown in FIGURES 3 and 4, the stream in effect is laid on top of the gas jet and is flattened somewhat at the point of contact. As a result, beginning at the lower portion of the stream, the stream is dispersed into a multiplicity of glass particles which are directed by the high energy jet in a slightly upward direction and are shaped by surface tension into spherical form.

As the glass particles continue to move along their path, they contact the upwardly inclined jet from the nozzle 32. This latter jet provides further loft to the particles, and the particles are directed along a generally arcuate path in space for a period of time sufficient to enable surface tension to further shape them into spherical form and to provide sufficient cooling to cause the setting thereof and thereby form glass beads.

Thereafter, the beads drop onto the floor 16 or into a suitable collector (not shown) where they are collected for grading and/or packaging. For many applications, the diameter of these beads customarily lies within the range of from about .125 inch down to about 25 microns, although in other cases the bead diameter may be somewhat outside this range. To vary the diameter of the beads, the valve 49 is adjusted to vary the velocity of the jet from the high energy nozzle 31. For relatively low velocities, the bead size approaches the upper portion of the above range, while at increased velocities, comparatively fine beads are produced.

As indicated heretofore, the nozzles 30, 31 and 32 are pivotally movable about the pivot points 36, 46 and 53, respectively. With this arrangement, the positions of the nozzles relative to the glass stream are adjustable in a rapid and straightforward manner to enable an extremely accurate control of the stream path. For example, in the embodiment illustrated in FIGURE 1, the nozzles 30 and 31 are positioned such that a substantially parallel relationship between the stream path and the axis of the gas jet from nozzle 31 is insured at all times during the dispersion of the beads. By varying the position of the nozzle 32, the loft of the glass particles is increased or decreased to thereby vary the time during which the particles pass through space prior to striking the floor 16.

Figure 6:
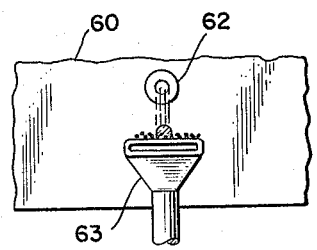
FIGURE 6 is a sectional view taken along the line 6—6 in FIGURE 5.

In FIGURES 5 and 6, there is shown a portion of a glass furnace 60 having a horizontally extending discharge tube 62 which protrudes from the furnace adjacent the lower, right-hand portion thereof. The tube 62 is fabricated from platinum or other heat resistant material and may be provided with suitable resistance heating apparatus (not shown), for example, to maintain the tube at an elevated temperature. Upon the heating of glass stock in the furnace 60 to a temperature sufficient to form molten glass, the glass is discharged from the tube 62 in a free-flowing, substantially horizontal stream.

Positioned immediately beneath the protruding end of the tube 62 is a horizontally oriented nozzle 63 which is in general similar to the nozzle 31 (FIGURE 1) described heretofore. The nozzle 63 is supplied with air or other fluid under pressure from a suitable source (not shown in FIGURES 5 and 6) and serves to direct a diverging, high energy fluid jet along a substantially horizontal path. The nozzle is oriented in sufficient proximity with the tube 62 so that, at the time the jet of fluid strikes the molten glass stream, the direction of flow of the stream is substantially horizontal and is parallel to the axis of the jet. At the point of contact, as best shown in FIGURE 6, the stream is dispersed into a multiplicity of glass particles. These particles are directed by the jet in an upwardly inclined direction for a period of time sufficient to enable surface tension to shape them into spherical form and to cause the setting thereof to form glass beads.

Figure 7:
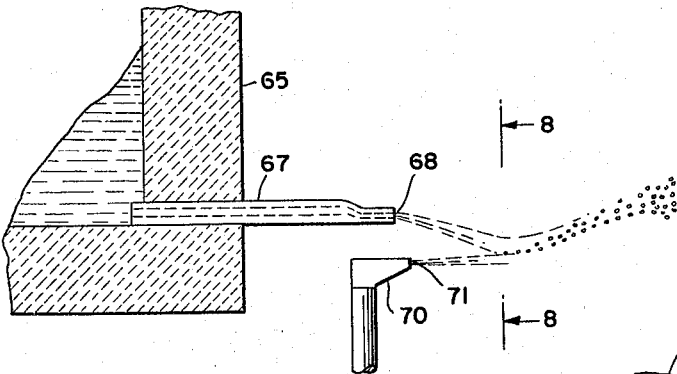
FIGURE 7 is a fragmentary view in general similar to FIGURE 3 but showing portions of an apparatus in accordance with a further illustrative embodiment of the invention.
Figure 8:
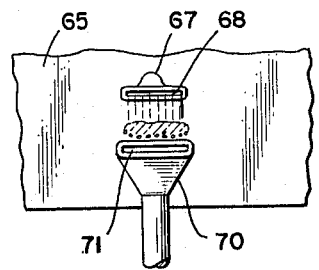
FIGURE 8 is a sectional view taken along the line 8—8 in FIGURE 7.

In the embodiment illustrated in FIGURES 7 and 8, a glass furnace 65 is provided adjacent its lower, right-hand end with an elongated, horizontally extending discharge conduit 67. The conduit 67 is of generally tubular construction but is flattened at the outer end thereof to form a substantially rectangular discharge opening 68. The arrangement is such that, upon the heating of the furnace to form molten glass, the glass is discharged from the member 67 in a flattened, substantially horizontal stream of generally rectangular cross-section.

A nozzle 70 is disposed immediately beneath the discharge opening 68 and is arranged to direct a diverging, high energy jet of air in a direction which is substantially parallel to and in close proximity with the molten glass stream. The nozzle 70 includes a flattened, rectangular outlet aperture 71, with the result that the cross-section of the air jet also is of flattened, substantially rectangular configuration. Because of the flattened configuration of the glass stream, the jet of air makes initial contact therewith along the expanded lower surface thereof to cause an extremely rapid and complete breaking up of the stream into a multiplicity of glass particles. Thereafter, the particles are carried along their path in a manner similar to that described heretofore for a period of time sufficient to enable the shaping and setting thereof to form glass beads.

The terms and expressions which have been employed are used as terms of description and not of limitation, and there is no intention in the use of such terms and expressions, of excluding any equivalents of the features shown and described, or portions thereof, it being recognized that various modifications are possible within the scope of the invention claimed.

What is claimed is:

1. In a method for forming spherical particles of vitreous material, the steps of discharging a molten stream of vitreous material along a path from a supply thereof, directing a diverging jet of fluid along an axis substantially parallel to the path followed by said molten stream and in the same direction as said stream, said jet being immediately adjacent and spaced in sufficient proximity to said molten stream so that said jet contacts at least a portion of said stream, to disperse the same into a multiplicity of discrete particles, said particles being shaped by surface tension into spherical form as they continue their movement, and cooling said particles to cause the setting thereof.

2. In a method for forming spherical particles of vitreous material, the steps of discharging a molten stream of vitreous material along a substantially horizontal path from a supply thereof, directing a diverging gas jet along an axis substantially parallel to said path and spaced in sufficient proximity thereto so that said jet contacts at least a portion of said stream, to disperse the same into a multiplicity of discrete particles, both said jet and said stream moving in substantially parallel directions immediately prior to their initial contact, said particles being shaped by surface tension into spherical form as they continue their movement, and cooling said particles to cause the setting thereof.

3. In a method for forming spherical particles of vitreous material, the steps of discharging a molten stream of vitreous material along a path from a supply thereof, directing a diverging gas jet of high kinetic energy at approximately room temperature along an axis substantially parallel to the path followed by said molten stream and in the same direction as said stream, said jet being immediately adjacent and spaced in sufficient proximity to said molten stream so that said jet contacts at least a portion of said stream, to disperse the same into a multiplicity of discrete particles, said particles being shaped by surface tension into spherical form as they continue their movement, and cooling said particles as they move along said path to cause the setting thereof.

4. In a method for forming spherical particles of vitreous material, the steps of melting said material in a container therefor, discharging a stream of the molten material from said container into a space in a generally horizontal direction, directing a diverging jet of fluid into said space along an axis substantially parallel to and immediately adjacent said stream, said jet contacting said stream to disperse the same into a multiplicity of discrete particles, both said jet and said stream moving in substantially parallel directions immediately prior to their initial contact, and directing said particles along an arcuate path in said space for a period of time sufficient to enable surface tension to shape the particles into spherical form and to cause the setting thereof.

5. In a method for forming glass beads, the steps of melting glass stock in a container therefor so as to form molten glass of relatively low viscosity, discharging a stream of said molten glass from said container into a space in a generally horizontal direction, directing a diverging fluid jet of high kinetic energy into said space along an axis substantially parallel to and immediately adjacent said stream, said jet contacting said stream to disperse the same into a multiplicity of glass particles, both said jet and said stream moving in substantially parallel directions immediately prior to their initial contact, and directing said particles along an arcuate path in said space for a period of time sufficient to enable surface tension to shape the particles into spherical form and to cause the setting thereof to form glass beads.

6. In a method for forming glass beads, the steps of discharging a stream of molten glass from a supply thereof into a space, applying a first, non-dispersing fluid jet to said stream to direct the same along a generally horizontal path, thereafter directing a second, diverging fluid jet along an axis substantially parallel to and immediately adjacent said stream and in spaced proximity therewith, said second jet contacting at least a portion of said stream to disperse the same into a multiplicity of glass particles, both said second jet and said stream moving in substantially parallel directions immediately prior to their initial contact, and directing said particles along an arcuate path in said space for a period of time sufficient to enable surface tension to shape the particles into spherical form and to cause the setting thereof to form glass beads.

7. In a method for forming glass beads, the steps of melting glass stock in a container therefor to form molten glass of relatively low viscosity, discharging a stream of said molten glass from said container into the atmosphere, applying a first, non-dispersing jet of gas to said stream to direct the same along a generally horizontal path, thereafter directing a second, diverging jet of gas along an axis substantially parallel to and immediately beneath said horizontal path, and in spaced proximity therewith, the kinetic energy of said second gas jet being substantially greater than that of said first gas jet, said second jet contacting said molten glass stream to disperse said stream into a multiplicity of glass particles, and directing said glass particles into a space for a period of time sufficient to enable surface tension to shape the particles into spherical form and to cause the setting thereof to form glass beads.

8. A method for forming spherical particles of vitreous material comprising melting said vitreous material in a container therefor, discharging a stream of the molten material from said container into the atmosphere, applying a first, non-dispersing jet of gas to said stream to direct the same along a controlled path thereafter, directing a second, diverging jet of gas along an axis substantially parallel to and immediately adjacent said path and in spaced proximity therewith, said second jet contacting said stream to disperse the same into a multiplicity of discrete particles, and then applying a third jet of gas to said particles to direct said particles into a space for a period of time sufficient to enable surface tension to shape the particles into spherical form and to cause the setting thereof.

9. A method for forming glass beads comprising melting glass stock in a container therefor to form molten glass of relatively low viscosity, discharging a stream of said molten glass from said container into the atmosphere, applying a first non-dispersing jet of gas to said stream to direct the same along a generally horizontal path, directing a second, diverging jet of gas along an axis substantially parallel to and immediately beneath said horizontal path and in spaced proximity therewith, the velocity of said second gas jet being substantially greater than that of said first gas jet, said second jet contacting said molten glass stream to disperse said stream into a multiplicity of glass particles, and applying a third jet of gas to said glass particles in an upwardly inclined direction to direct said particles into a space for a period of time sufficient to enable surface tension to shape the particles into a spherical form and to cause the setting thereof to form glass beads.

10. In an apparatus for forming glass beads, in combination, means for discharging a stream of molten glass of relatively low viscosity from a supply thereof along a generally horizontal path, and nozzle means in juxtaposition with said discharge means for directing a diverging jet of gas along an axis substantially parallel to and immediately adjacent said horizontal path and for dispersing said stream into a multiplicitly of glass particles, both said jet and said stream moving in substantially parallel directions immediately prior to their initial contact, and directing said particles into a space for a period of time sufficient to enable surface tension to shape the particles into spherical form and to cause the setting thereof to form glass beads.

11. Apparatus of the character set forth in claim 10, in which said discharge means includes an elongated, horizontally oriented tube through which said molten glass stream is discharged, and means for applying heat to said tube during the discharge of said stream.

12. Apparatus of the character set forth in claim 11, in which the discharge end of said tube is of substantially rectangular configuration, to discharge the molten glass in a flattened stream.

13. In an apparatus for forming glass beads, in combination, means for discharging a stream of molten glass from a supply thereof into the atmosphere, means including a first, non-dispersing nozzle in juxtaposition with said discharge means for applying a first jet of gas to said stream to direct the same along a generally horizontal path, and means including a second nozzle downstream of said first nozzle and in close proximity with said discharge means for directing a second, diverging jet of gas along an axis substantially parallel to and immediately adjacent said horizontal path and in spaced proximity therewith, the kinetic energy of said second gas jet being substantially greater than that of said first gas jet, said second jet contacting said molten glass stream to disperse said stream into a multiplicity of glass particles and directing said particles into a space for a period of time sufficient to enable surface tension to shape the particles into spherical form and to cause the setting thereof to form glass beads.

14. Apparatus for forming glass beads comprising, in combination, means for discharging a stream of molten glass from a supply thereof into the atmosphere, means including a first, non-dispersing nozzle in juxtaposition with said discharge means for applying a first jet of gas to said stream to direct the same along a generally horizontal path, means including a second nozzle downstream of said first nozzle and in close proximity with said discharge means for directing a second, diverging jet of gas along an axis substantially parallel to and immediately adjacent said horizontal path and in spaced proximity therewith, said second jet contacting said molten glass stream to disperse said stream into a multiplicity of glass particles, and means including a third nozzle downstream of said second nozzle for applying a third jet of gas to said glass particles to direct said particles into a space for a period of time sufficient to enable surface tension to shape the particles into spherical form and to cause the setting thereof to form glass beads.

15. Apparatus of the character set forth in claim 14, in which each of said nozzles includes a rectangular discharge opening, the area of the opening of said first and third nozzles being larger than the area of said second nozzle, whereby the velocity of said second gas jet is substantially greater than the velocities of said first and said third gas jets.

16. Apparatus for forming glass beads comprising, in combination, means for discharging a stream of molten glass of relatively low viscosity from a supply thereof into the atmosphere, means including a first, non-dispersing nozzle in juxtaposition with said discharge means for applying a first jet of gas to said stream to direct the same along a generally horizontal path, means including a second nozzle downstream of said first nozzle and in close proximity with said discharge means for directing a second, diverging jet of gas along an axis substantially parallel to and immediately adjacent said horizontal path and in spaced proximity therewith, the kinetic energy of said second gas jet being substantially greater than that of said first gas jet, said second jet contacting said molten glass stream to disperse said stream into a multiplicity of glass particles, and means including a third nozzle downstream of said second nozzle for applying a third jet of gas to said glass particles to direct said particles in an upwardly inclined directions into a space for a period of time sufficient to enable surface tension to shape the particles into spherical form and to cause the setting thereof to form glass beads.

References Cited by the Examiner

UNITED STATES PATENTS

| | | | |
|---|---|---|---|
| 2,136,988 | 11/1938 | White | 65—141 XR |
| 2,460,993 | 2/1949 | Le Brasse et al. | |
| 2,461,011 | 2/1949 | Taylor et al. | 65—21 |
| 2,614,619 | 10/1952 | Fuller. | |
| 2,889,580 | 6/1959 | Wald et al. | 65—21 |
| 2,928,609 | 3/1960 | Osborne. | |
| 2,965,921 | 12/1960 | Bland | 65—21 |
| 2,968,062 | 1/1961 | Probst et al. | |
| 3,074,257 | 1/1963 | Searight | 65—141 |
| 3,150,947 | 9/1964 | Bland | 65—21 |

FOREIGN PATENTS 844,573    8/1960  Great Britain.

DONALL H. SYLVESTER, *Primary Examiner.*

MICHAEL V. BRINDISI, L. D. RUTLEDGE, G. R. MYERS, *Assistant Examiners.*